Patented Nov. 17, 1959

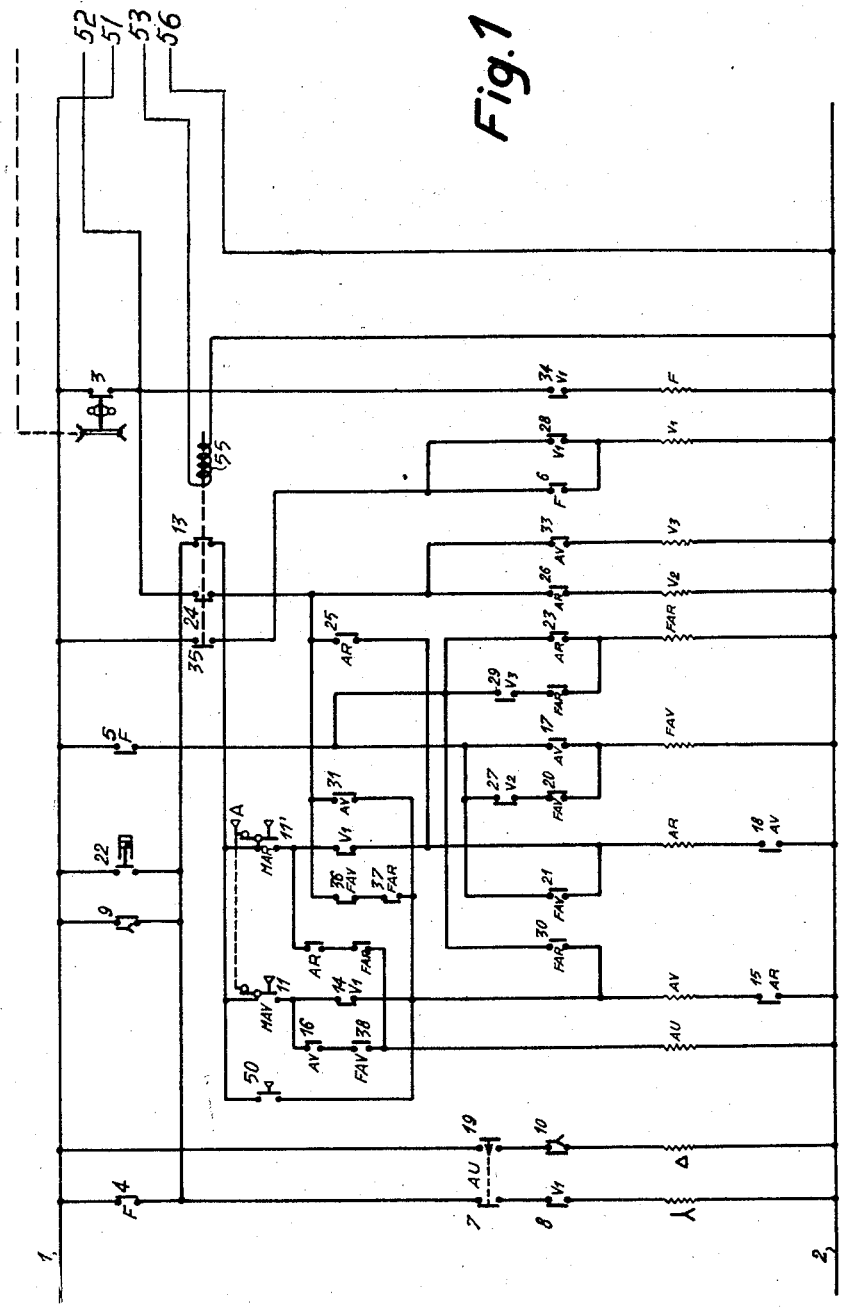

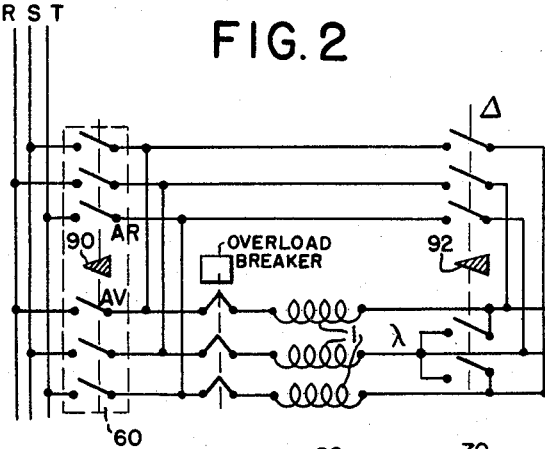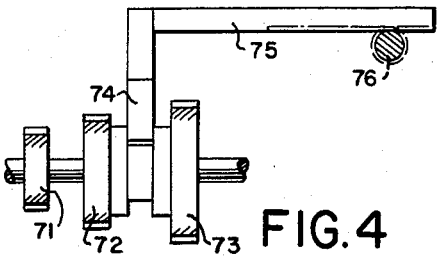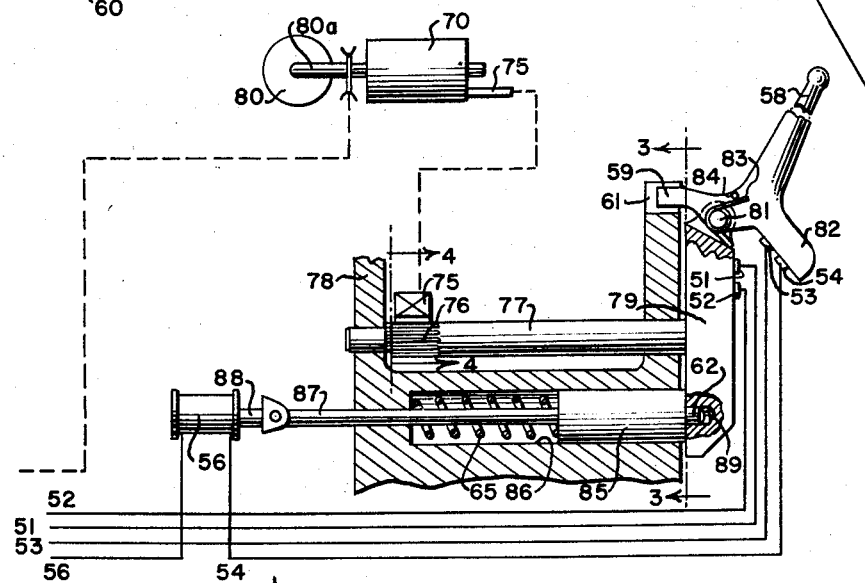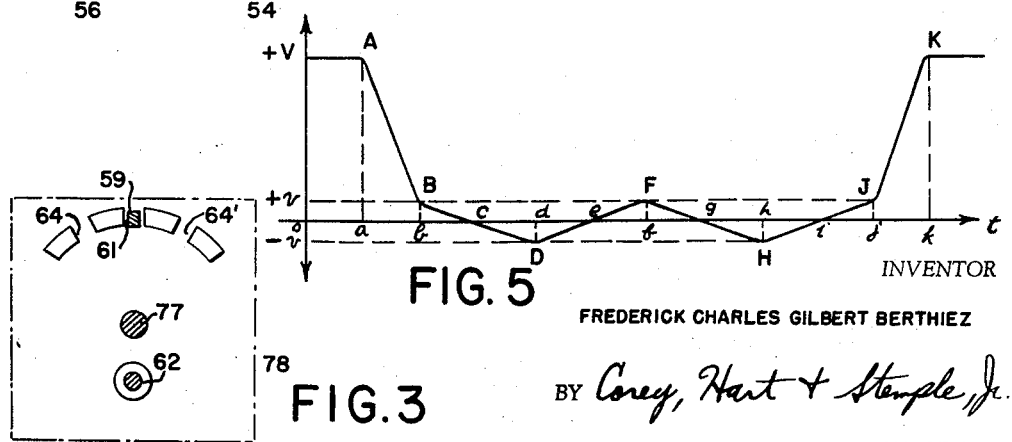

2,912,875

DRIVE TRANSMISSION CONTROL

Frederick Charles Gilbert Berthiez, Lamorlaye, France, assignor to Societe Anonyme des Anciens Etablissements Charles Berthiez, Paris, France Application December 9, 1955, Serial No. 552,193

Claims priority, application France August 2, 1955

18 Claims. (Cl. 74—472)

This invention relates to drive transmissions of the type in which a plurality of drive ratios is obtainable between an input shaft driven by a motor and an output shaft adapted to drive a load, and in which the enabling and disabling of at least one of said drive ratios requires that a pair of toothed elements, such as gears and/or dog clutch members or the like, be relatively displaced for bringing such elements into and out of meshing engagement, as the case may be.

The invention is more specifically concerned with such transmissions wherein the motor driving the input shaft is an electric motor.

In the operation of such multi-gear transmissions, a condition will frequently arise wherein the toothed elements cannot be brought into effective interengaging relationship because the tops of the teeth of the respective elements happen to be presented in mutual abutment at the time the movable one of said elements is displaced towards the other element. It has previously been proposed to obviate this objectionable behavior by imparting to the input shaft of the transmission a slow alternating rotation or hunting motion before the speed-change lever or equivalent control means of the transmission is actuated to alter the drive ratio therethrough. By thus slowly rocking the input shaft to-and-fro the relative angular position between the two elements that are to be brought into intermeshing engagement is continuously varied so that at some time the angular relationship necessarily becomes such as to allow the elements to intermesh freely.

In previous systems of this type the above mentioned slow rocking or hunting motion of the shaft was produced by hydraulic means. However, in cases where the drive motor is an electric motor, the provision of separate hydraulic drive mechanism for the purpose of rocking the shaft would be a complication and an expense. It is accordingly a principal object of this invention to achieve an equivalent result by purely electrical instrumentalities.

Another object of this invention is to provide a mechanical multi-ratio transmission system employing interengageable toothed elements, such as sliding gears, dog clutch members, or the like, adapted for use with an electrical drive motor, which system will at all times be operable at the first attempt to change the ratio therein. A further object is to impart a slow and gradual hunting motion to the input shaft of a transmission system of the type described in response to the actuation of the gear-shifting control of the system and for the whole duration of the gear-shifting operation. A still further object is to accomplish this result both when it is desired to shift gears in the stationary condition of the motor as well as in running operation of the motor. Another object is to prevent actuation of the gear-shifting control if the motor speed exceeds a prescribed value. A further object is the provision of a novel electrical control circuit for a variable-speed, reversible electric motor.

The above and further objects and advantages of the invention will appear as the description proceeds.

According to an aspect of this invention there is provided, in an assembly including a reversible variable-speed electric motor and transmission mechanism including an input shaft driven from the motor, an output shaft driving a load and toothed means shiftable for varying the drive ratio from the input to the output shaft, electrical means for selectively energizing the motor for rotation in either direction at full speed, further electrical means for automatically energizing the motor for alternate rotation in both directions at reduced speed, and means for effecting operation of this further means during a shifting of said toothed means.

In the accompanying drawings, given by way of illustration but not of limitation:

Figs. 1 and 2 show a circuit diagram and operative parts of a novel motor control system in accordance with the invention, including the motor field windings and the means for connecting said windings to a three-phase supply network directly for energizing the motor at full power, and indirectly through associated resistances for energizing the motor at reduced power during the "hunting" operation;

Figure 3 is a view in line 3—3 of Fig. 2;

Figure 4 is a view on line 4—4 of Fig. 2; and

Figure 5 is a graph illustrating the operation of the motor before, during, and after a period of "hunting" in accordance with the invention, the abscissae indicating time and the ordinates indicating motor speed.

In the illustrative construction shown in the drawings, the invention is embodied in a system comprising a three phase induction motor having rotor 80 which may drive any desired load apparatus, and a control circuit for this motor which includes, in a conventional manner, a start switch adapted to connect the field windings $i$ of the motor in $\lambda$ relation, and a normal operation switch for connecting the field windings in $\Delta$ relation.

Interposed between the drive motor and the load apparatus is a change-speed unit 70 comprising an input shaft 80a connected with the motor and sliding gears 71, 72, 73, Fig. 4, mounted on a counter shaft for meshing different gears on the output shaft 70a. The sliding gears are operated by means of a fork member 74 having a rack member 75 integrally connected to it. The rack 75 is in mesh with a pinion 76 integrally formed on a shaft 77 journalled in the casing 78 of the change speed unit. Secured on the outer end of shaft 77 is a disc 79 (Fig. 2) having a pin 81 secured at a peripheral point thereof transversely of the radial plane through the axis of the shaft 77. Journalled on the pin 81 for rotation in the radial plane is a speed change control lever 58. The lever 58 is formed with a first arm 59 adapted for selective engagement with any one of a number of notches such as 61, 64, 64', Fig. 3, formed in the adjacent wall of the casing for latching the lever in each of a number of positions corresponding to the respective gear settings, three such positions being shown herein. Another arm 82 of lever 58 carries a pair of electrical contacts 53, 54 adapted for cooperation with respective contacts 51, 52 on the disc 79 on rotation of lever 58 about its pivot 81. The lever 58 is biased towards its latching position, as illustrated, by a spring 83 having one end anchored to the pin 81 and its other end engaging a stop 84 carried by the lever 58. With the lever positioned so that the contacts 53 and 54 are in engagement with the contacts 51 and 52, the latching arm 59 is clear of all the notches 61, 64, 64'.

Moreover, means are provided for holding the disc 79 in each of its positions, so long as the motor is running at its normal operating speed, as will be described in fuller detail hereinafter, and such means include a latch member 62 projecting axially from the outer end of a piston 85 slidable in a bore 86 formed in the change-speed unit casing. Projecting axially from the other end of piston 85 is a rod 87 having its far end connected to a magnetic core member 88 slidable within a solenoid coil 56. The latch 62 is adapted to project into any one of a number of cooperating sockets 89 formed in the inner face of disc 79. The latch 62 is biased by a spring 65 towards its projected or latching position. On energization of solenoid 56 in a manner presently made clear, the core 88 is attracted leftward (in the drawing) so that the latching piston assembly is moved bodily leftward against the force of spring 65 to disengage latch 62 from the socket in disc 79 with which it was engaged.

Referring next to Fig. 1, the electrical circuit is there illustrated for controlling the motor and the connection of the circuit to the electrical contacts 51, 52, 53, 54 and solenoid winding 56 as well as the latch 62 controlled. The circuit is powered from the general supply lines 1 and 2, Fig. 1.

The circuit includes a first manual "forward start" switch MAV including the normally open contacts 11 closure of which is adapted to complete a circuit for operating the motor in the forward direction, and a second manual "reverse" start switch MAR including the normally open contacts 11′ closure of which completes a circuit for operating the motor in the reverse direction, as will presently appear. A "stop" manual control is provided as indicated at A, operable for restoring both start switches MAV and MAR to their normal open positions. A relay winding 55 is energized through a circuit which includes the previously mentioned contacts 51—53, to open a normally closed pair of contacts 13, and close the normally open pairs of contacts 24 and 35. A speed limit switch 3 is normally closed and is opened by the action of a centrifugal speed governor or the like driven by motor 80 through the connection shown diagrammatically in dotted line in Figs. 1 and 2 on the motor attaining a prescribed low speed in either direction, e.g. 100 r.p.m. A lubricant pressure control switch 22 is normally open, and is closed by the action of a suitable pressure responsive member when the oil pressure in the lubricant system of the machine has reached a prescribed operating value The circuit further includes a number of relays for performing various control functions in the operation of the machine. The windings of these relays have been indicated in a horizontal row toward the lower part of the diagram in Fig. 1, and include:

Relay winding λ for connecting the motor field windings in a λ-circuit; relay winding Δ for connecting the motor field windings in a Δ-circuit; relay winding AV for starting the motor in the forward sense of rotation; relay winding AR for starting the motor in the reverse sense; relay FAV controlling the application of brake power to the motor during forward rotation; relay FAR controlling brake application during reverse rotation, it being noted that the braking of the motor is produced by reversing the polarity of the excitation applied thereto. The five remaining relays, designated respectively as F, AU, V1, V2 and V3, will be described and their functions specified in the course of the disclosure.

Associated with the above relay windings are contacts each of which is designated on the diagram by a number reference as well as a letter reference corresponding to the letter reference of the relay winding controlling it. In the ensuing description, however, only the number references of the relay contacts will be used since the contacts are quite unambiguously identified thereby. Before commencing the description of the circuit operation, the following further points should be noted:

Relay contacts 7 and 19 have suitable delay means associated therewith, whereby normally closed contacts 7 are opened, and normally open contacts 19 are closed, only after a predetermined period of time has elapsed from the energization of the associated relay winding AU.

Switch 50 is a normally open, manually operated push- button switch closure of which is adapted to effect an intermittent or step-by-step operation of the motor.

The field windings $i$ of the three-phase motor are illustrated in Fig. 2 as being supplied from the three-phase A.-C. lines R, S, T through a conventional reversing switch 60. In Fig. 2 a pair of normally open relay contacts λ associated with relay winding λ, Fig. 1, are also shown and it will be seen that closure of these contacts on energization of associated relay winding λ is operative to switch the motor field connections from Δ to λ relationship. Fig. 2 also illustrates the normally open relay contacts 48 associated with relay winding V1, Fig. 1, energization of which will close said contacts to insert resistances 49 into the λ-coupled field windings in series with said windings to reduce the motor torque. The λ contacts are at such times open. The cross hatched triangular elements 90, 92 in Fig. 2 symbolically indicate that either of the sets of contacts interconnected by the dotted line may be operated to determine as to element 90 with respect to switch 60 the forward and reverse rotation of the motor and as to element 92 the Δ or λ connection of the motor windings but that, when operated in a selected direction, the other contacts are locked against operation.

The principal circuit elements of Fig. 1 having thus been described, it is believed unnecessary to describe in detail the circuit connections between them, since such connections are clearly identifiable from Fig. 1 and will moreover become self-evident as the functional disclosure proceeds. Operation of the circuit of Fig. 1 is as follows.

When voltage is applied to the supply lines 1, 2, relay winding F is energized through a circuit including speed responsive switch 3, now closed since the motor is not rotating, and normally closed contacts 34 of relay V1. Energization of relay F closes contacts 4 and contacts 6 associated therewith, both normally open, and open contacts 5, normally closed. Closure of contacts 4 produces energization of relay winding λ through a circuit including normally closed contacts 7 and 8. Energization of relay λ closes the λ contacts, Fig. 2, connecting the motor field windings in λ relationship. Further, energization of relay λ simultaneously closes normally open contacts 9 and opens normally closed contacts 10.

In this condition of the system it is possible to operate the electric motor, and hence the load apparatus driven by it, at the speed determined by the particular gear setting that happens to be engaged in the change speed unit, or first to shift gear setting to some other gear. For purposes of explanation it will first be assumed that the gear setting is that corresponding to forward drive, and that it is desired to operate the system at this particular setting.

"Forward start" switch button MAV is first pushed in, closing switch contacts 11. This energizes relay winding AV through a circuit including contacts 9, now closed, normally closed contacts 13, contacts 11 now closed, and normally closed contacts 14 and 15. The λ-coupled motor windings are thus energized and the motor is started in forward rotation. Energization of relay AV simultaneously closes associated contacts 16 and 17, normally open, and opens associated contacts 18, normally closed.

The closure of contacts 16 and 17 has no immediate effect. However, after the motor has attained a predetermined speed switch 3 is opened and relay winding F is deenergized. This allows contacts 4 to open and contacts 5 to close. While the opening of contacts 4 has no immediate effect, closure of contacts 5 completes a circuit for relay winding FAV which now becomes energized (owing to the previous closure of contacts 17) resulting in the closure of each of the normally open associated contacts 20, 21 and 38. Time delay relay AU thus becomes energized.

At a time determined by the time constant of time delay relay AU, contacts 7 are opened and contacts 19 are closed. Opening of contacts 7 deenergizes relay winding λ and closure of contacts 19 energizes relay winding Δ; thus the connections of the motor field windings are now switched from λ relationship to Δ relationship.

Deenergization of relay winding λ has allowed the contacts 9 to return to their open condition and contacts 10 to close; however, the pressure-responsive switch 22 has by this time been closed in response to the pressure in the lubricant system having reached a predetermined normal value, so that relays AV and AU remain energized to maintain contacts 19 closed and the motor field windings continue to be normally energized and the motor continues to revolve in the forward direction in Δ connection. The load apparatus is driven at the speed determined by the setting in the change-speed unit.

When desired to stop the motor, "stop" button A is depressed, opening the contacts 11 and thus deenergizing relay windings AU and AV. Deenergization of relay AU opens the contacts 19 so that the relay winding Δ is deenergized; deenergization of relay AU also closes contacts 7, so that relay winding λ is energized over the circuit extending through contacts 22, 7 and 8. Energization of relay λ closes the contacts 9, thereby completing a holding circuit for relay λ so that said relay will remain energized after the pressure responsive switch 22 has been opened due to the fall in oil pressure. These operations close contacts λ for the field windings i and change their connection from Δ to λ.

Simultaneously deenergization of relay AV opens the contacts 16 and 17 but this has no immediate effect since the relay winding FAV remains energized over the circuit including contacts 5, 27 and 29. However, deenergization of relay AV also results in the closure of contacts 18, thereby energizing the relay winding AR through the contacts 5, 21 and 18. Energization of relay AR has the effect of applying reverse excitation to the λ-connected motor field windings, thereby retarding the motor until the motor speed has reached a predetermined low value at which time governor switch 3 closes. This again energizes relay winding F which closes contacts 4 and 6 with no immediate effect, and also opens contacts 5, deenergizing relay winding AR a very short time before the forward rotational speed of the motor has reduced to zero.

The above has described a complete cycle of motor operation including starting, normal operation and retardation of the motor in the forward direction. It will easily be seen that a reverse cycle of motor rotation will proceed in a similar manner, if the "reverse start" switch button MAR was depressed instead of button MAV. In such circumstances the relays AR and FAR perform corresponding functions to the functions of the relays AV and FAV as described above.

The operation of the system will now be described in cases where it is desired to change the speed setting. Such a change in speed may be effected with the system in the stationary condition or in operation.

Assume first that the motor is rotating in the forward direction, with the change speed lever 58 set at a certain position. Assuming it is desired to change the speed setting, the lever 58 is first depressed, thereby releasing the latching arm 59 from the particular notch e.g. 61, with which it was engaged, and moving contacts 51 and 53 into engagement and contacts 52 and 54 into engagement. However, since the latch 62 is still projected into engagement with the socket in disc 79, the disc cannot at this time be rotated to change the speed setting.

As previously indicated, with the motor revolving in the forward sense the contacts 9, 3, 7 and 18 are open while contacts 22, 11, 16, 19, 17, 20 and 21 are closed, the remaining contacts of the system are in their initial or idle condition, and relays AV, Δ, AU and FAV are energized. Under these conditions depression of lever 58 has the following effects. Owing to closure of the contacts 51—53 relay 55 is energized, thereby opening contacts 13 and closing contacts 24 and 35. The opening of contacts 13 accomplishes a similar result to the actuation of "stop" button A. Concomitantly with the resulting deenergization of relay AV, as previously described, contacts 18 are closed and relay AR is energized through contacts 5, 21, resulting in the application of a braking torque to the motor. Moreover, contacts 23, 25 and 26 associated with relay AR close while contacts 15 open to deenergize relay AV. Relay FAR now becomes energized through a circuit including the contacts 5 and 23, and closes the contacts 30 to energize relay $V_2$ through contacts 26, 31, 30 and 5. Relay AV remains deenergized as contacts 15 are open. The closure, as mentioned above, of contacts 24 and 35 has no immediate result since contacts 3 and 6 are open at the time.

As a result of the braking torque applied to it the motor decelerates rapidly until at a predetermined low speed the governor switch 3 closes, completing an energizing circuit for solenoid winding 56 which extends through contacts 3 and 52—54 now closed since the lever 58 is held in its depressed position until such time as the desired speed setting has been clutched in. Energization of solenoid winding 56 retracts the latch projection 62, thereby releasing disc 79 for rotation. Lever 58 is now rotated about the axis of shaft 77 while still being retained in its depressed position, and is brought to the angular position corresponding to the desired new speed setting. As will now be described, a slow back-and-forth swinging motion automatically is now imparted to the motor by the operation of the controls in order to facilitate the interengagement between the gear and/or clutch teeth involved in the new speed setting.

Whereas the closure of speed responsive switch 3 in the previously described type of operation, when "stop" button A was actuated to stop the motor completely, had resulted in suspending the braking action on the motor, the closure of switch 3 under the conditions now being described achieves a different result. First, closure of switch 3 energizes relay winding AR through the circuit including contacts 3, 24, 25, so that the braking action is continued; and moreover closure of switch 3 energizes the relay F. This opens contacts 5 with no immediate effect since relay FAV still remains energized over contacts 3, 24, 25, 21, 27 and 20. Energizing relay F also closes contacts 6, energizing relay $V_1$ over the circuit including closed contacts 35; energization of relay $V_1$ closes contacts 28, completing a holding circuit for the relay $V_1$. Energization of relay $V_1$ opens contacts 34, deenergizing relay F over the whole time required to complete the gear shifting operation. Energization of relay $V_1$ further opens contacts 8, thereby deenergizing the relay winding λ and opening contacts λ at the field windings i. At the same time, however, contacts 48, Fig. 2, are closed, so as to connect the resistors 49 in circuit with the motor field windings. The result of the two actions just mentioned, as will be clearly apparent from Fig. 2, is to connect the field windings in λ relationship in series with the resistors 49, thereby reducing the accelerating and decelerating torque applied to the motor throughout the period that the motor is oscillating to and fro in order to facilitate the interengagement between the teeth of the gears and/or clutches of the transmission system.

Closure of speed responsive switch 3 with the relay 55 energized also causes energization of the relay winding $V_2$ through a circuit including the contacts 24 and 26, thereby opening the contacts 27 and deenergizing relay winding FAV.

It should be noted that the energization of relay winding $V_1$, in addition to the actions described above, also results in opening the contacts 14, thereby deenergizing relay winding AV, even through the "forward start" switch button MAV remains depressed when contact 13 closes upon deenergizing relay 55.

Thus the braking action applied to the motor is continued, though to a more moderate degree than in the case when the motor is to be stopped completely. Eventually the forward speed of the motor is reduced to zero, then reversed so that the motor starts revolving in the reverse direction under a low torque, then gathers speed until its speed is sufficient to open the speed responsive switch 3. This deenergizes relay AR since contacts 36 are now open owing to the previous deenergization of relay FAV. Deenergization of relay AR closes the contacts 15. Moreover, opening of the switch 3 also deenergizes the relay winding V2, closing the contacts 27.

Closure of contacts 15 completes an energizing circuit for relay AV extending through contacts 5, 30 and 15, thereby closing the contacts 31, 17 and 33. Closure of contacts 17 energizes relay FAV while relay FAR remains energized, so that the reverse rotation of the motor is gradually retarded. Eventually speed switch 3 is closed, completing a holding circuit for relay AV over contacts 24, 31 and 15, and simultaneously completing an energizing circuit for relay V3 which thereupon causes the contacts 29 to open and thereby deenergizes relay FAR.

The gradual deceleration of the motor rotating in reverse is continued, the motor comes to a stop and then begins revolving in the forward sense until the speed switch 3 opens and deenergizes the relay AV, since contacts 30 are now open due to deenergization of relay FAR. Deenergization of relay AV closes the contacts 18. This permits the subsequent energization of reverse relay AR.

It will thus be seen as a result of the cyclic operation described that there is imparted to the motor a sequence of alternating reversals in motion throughout which the motor speed is limited to a low value by the action of speed switch 3, thereby allowing ready interengagement of the clutch or gear elements of the speed change unit. As soon as the desired new gear setting has been clutched in, the lever 58 is released, and its latching arm 59 engages the particular notch, e.g. 64, that corresponds to said new setting. At the same time the contacts 51 and 53 separate, so that relay 55 is deenergized and contacts 13 are thus allowed to close while contacts 24 and contacts 35 are allowed to open, deenergizing relay V1 and also deenergizing relay V2 and relay V3 in case either of these relays was energized at the time.

In this way the forward rotation of the motor at normal operating speed, which up to that time was suspended in order to permit performance of the gear shifting operation, is now reestablished, relay AV being now energized either through the contacts 11 of the "forward start" switch MAV, if not already energized previously. Moreover, at the time the lever 58 was released the contacts 52 and 54 also became disengaged, so that solenoid 56 is deenergized and the latch 62 is actuated by spring 65 to latch the lever 58 in its new setting, as described.

The above described operation of the motor during a gear shifting operation will be more readily understood by reference to the time graph of Fig. 5, which indicates the variations of motor speed with time. As shown in the graph, the motor is initially assumed to be revolving at a positive (i.e. forward) speed $+V$. At the time $a$, lever 58 is depressed resulting in a sudden decrease of motor speed by changing from $\Delta$ to $\lambda$ connection and by operation of the contacts AR, AV of the reversing switch 60, Fig. 2, until it assumes the value $+v$ at the time $b$. Thereafter the retarding action is reduced by connecting resistors 49 in series with the respective field windings and the motor continues to decelerate but at a slower rate until it comes to a stop at the time $c$, and then starts in reverse under a reduced torque so as to attain the negative (reverse) speed $-v$ at the time $d$, corresponding to the instant at which the speed responsive switch 3 opens. A moderate retarding torque is now being applied to the motor so that it becomes stationary at the time $e$ and then starts accelerating in the forward direction under reduced torque to attain the speed $+v$, which is the limiting value of the reduced speed, at the time $f$. Again speed switch 3 opens to apply the reduced braking torque, and so on. This type of "hunting" goes on until such time, as exemplified by the point $j$ on the graph, when the lever 58 has been rotated and released. The motor is now allowed to gather speed until it ultimately returns to its normal operating speed K at the time $+V$. While two complete hunting cycles of the motor have been shown in Fig. 5 by way of example, it will be evident that the actual number of such cycles that will occur in any particular instance may be less or more.

It will likewise be obvious that the operation would essentially be the same in cases where the motor was initially rotating in the reverse rather than the forward direction.

If desired to shift gears in the stationary condition of the motor, the procedure is the following. In this condition the switch 3, the contacts 4, 6 and 9 are closed and all the remaining contacts are in their respective idle positions since all of the relays are deenergized except relay F and relay $\lambda$. On depression as before of the lever 58, relay 55 is energized, contacts 13 open to no useful effect, contacts 35 close and energize relay V1 with effects similar to those previously described, and contacts 24 close energizing relay AV through the circuit including contacts 3, 24, 36, 37 and 15. The motor now starts revolving in the forward direction at a low speed limited by the operation of speed responsive switch 3, upon occurrence of which the motor is subjected to a moderate retarding action, whereupon it gradually comes to a stop and reverses its motion to revolve at slow speed in reverse, and so on. This hunting operation may continue indefinitely since one or the other of contacts 36 or 37 remains open. Thus, the desired gear setting can easily be clutched in; thereafter, on the lever 58 being released, relay 55 is deenergized and the contact 13 closes and the contacts 24 and 35 are restored to their respective open positions, whereupon the rotation of the motor is stopped.

It should be understood that the single exemplary embodiment illustrated and described is by no means restrictive of the invention's scope. Many modifications will be apparent to those familiar with the art; thus, while a mechanical type of control was described for operating the sliding gears and/or clutches of the transmission unit, such control may of course be effected through electro-magnetic, hydraulic or other means as is well understood in the art.

I claim:

1. In an assembly comprising a variable-speed reversible electric motor, load apparatus and transmission mechanism operatively connecting said motor and apparatus and including change speed means operable between a plurality of speed settings for changing the drive ratio from the motor to the apparatus, a power supply, direction determining means connected in circuit with the motor and the power supply operative in one condition to energize said motor to rotate the motor in a selected direction, speed control means connected to said motor and to said direction determining means and operative in another condition to energize the motor according to a predetermined cyclic sequence, whereby the motor is alternately rotated in opposite directions at reduced speed, and means connected to said speed control means and to said change speed means and responsive to operation of said change speed means for switching said circuit to its other condition on said change speed means being moved away from a speed setting and for switching the circuit to its one condition on said change speed means being moved into a speed setting.

2. In a drive assembly comprising a variable speed reversible electric motor, an output shaft, a variable ratio transmission mechanism between the motor and shaft including means shiftable between two settings for altering the drive ratio between the motor and shaft, a power supply, means connected to said motor for determining the direction of rotation of said motor, means connected to the motor and supply and to said direction determining means and including first and second means and operable for applying full power to the motor for rotation in a forward and a reverse sense respectively at full speed, and third and fourth means connected to said direction determining means and operable for applying reduced power to the motor for rotation in said forward and reverse sense respectively at reduced speed, and means operatively connectible to said four means and to said shiftable means and switchable to one condition wherein either one of said first and second means is selectively operable and switchable to another condition during a shifting of said shiftable means for actuating said third and fourth means in an automatically alternating sequence.

3. In a drive assembly comprising a variable speed reversible electric motor, an output shaft, a variable ratio transmission mechanism between the motor and shaft including means shiftable between two settings for altering the drive ratio from the motor to the shaft, a power supply, means connected to said motor for determining the direction of rotation of said motor, means connected to the motor and the supply and to said direction determining means and including first and second means and operable for applying full power to the motor for rotation in a forward and a reverse sense respectively, third and fourth means connected to said direction determining means and operable for applying reduced power to the motor for rotation in said forward and reverse sense respectively, fifth and sixth means connected to said direction determining means and operable for applying a retarding torque to the motor against rotation in said forward and reverse sense respectively, and means operatively connected to said six means and to said shiftable means and switchable to one condition wherein either one of said first and second means is selectively operable and switchable to another condition during a shifting of said shiftable means for actuating said third, fifth, fourth and sixth means in that order in an automatically recurring sequence and for limiting the motor speed to a predetermined low value.

4. In a drive assembly comprising a variable speed reversible electric motor, an output shaft and transmission mechanism between the motor and shaft including means shiftable between two settings for altering the drive from the motor to the shaft, a power supply, direction determining means connected in circuit with the motor and the supply and including first and second means operable for applying full power to the motor for rotation in a forward and a reverse sense respectively, third and fourth means connected to said direction determining means and operable for applying reduced power to the motor for rotation in said forward and reverse directions respectively, fifth and sixth means connected to said direction determining means and operable for applying a high retarding torque to the motor against rotation in said forward and reverse sense respectively, seventh and eighth means connected to said direction determining means and operable for applying a reduced retarding torque to the motor against rotation in said forward and reverse sense respectively, means operatively connected to said eight means and to said shiftable means and switchable to one condition wherein one of said first, second, fifth and sixth means is selectively operable and switchable to another condition during a shifting of the shiftable means for actuating said third, seventh, fourth and eighth means in that order in an automatic sequence, and means operative in said other condition for limiting the motor speed to a predetermined reduced value.

5. In the assembly claimed in claim 3, means responsive to movement of the shiftable means away from a setting for switching said switchable means to said other condition and responsive to movement of the shiftable means into a setting for switching the switchable means to said one condition.

6. In the assembly claimed in claim 4, means responsive to said speed limiting means for preventing displacement of the shiftable means away from a setting thereof except when the motor speed is below said predetermined value.

7. In the assembly claimed in claim 4, means responsive to movement of the shiftable means away from a setting for switching said switchable means to said other condition and responsive to movement of the shiftable means into a setting for switching the switchable means to said one condition, and means responsive to said speed limiting means for preventing displacement of the shiftable means away from a setting except when the motor speed is below said predetermined value.

8. In an assembly comprising a reversible variable-speed electric motor, a variable ratio transmission mechanism including an input shaft of said mechanism driven from said motor and an output shaft of said mechanism, shiftable means operable for varying the drive ratio from said input to said output shaft, means connected to said motor and operable to control the speed of said motor, means connected to said motor and operable to determine the direction of rotation of said motor, and electrical means connected to said control means and to said direction determining means and responsive to said shifting means for imparting to the motor a to-and-fro hunting motion at reduced speed on operation of said shifting means.

9. In an assembly comprising a reversible variable-speed electric motor, a variable ratio transmission mechanism including an input shaft of said mechanism driven from the motor, an output shaft of said mechanism driving a load, means shiftable for varying the drive ratio from the input to the output shaft, means connected to said motor and operable to control the speed of said motor, means connected to said motor and operable to determine the direction of rotation of said motor, and electrical means connected to said control means and to said direction determining means and responsive to said shifting means for energizing the motor for rotation in a selected direction at full speed, further electrical means connected to said control means and to said direction determining means for automatically energizing the motor for alternate rotation in both directions at reduced speed, and means connecting said shiftable means to said two electrical means for automatically actuating said further means during a shifting of said shiftable means.

10. In the assembly claimed in claim 9, means connected to said direction determining means for selectively energizing the motor in reverse for applying thereto a high retarding torque when said motor is operating in either direction, and means connected to said further means for operation with said further means for energizing the motor in reverse for applying thereto a substantially lower retarding torque first in one direction and then in the other during said alternate rotation thereof.

11. In an assembly comprising a reversible variable-speed electric motor, a variable ratio transmission mechanism including an input shaft of said mechanism driven from the motor, an output shaft of said mechanism driving a load, means shiftable for varying the drive ratio between said shafts, means connected to said motor and operable to determine the direction of rotation of said motor, field windings for the motor, first means operable for selectively connecting said windings in circuit with a power supply for accelerating and decelerating the motor in either direction under high torque, impedances associated with said windings, further means for selectively connecting said windings in circuit with said impedances and with said power supply for accelerating and decelerating the motor in either direction under low torque, controls for operating said first means to decelerate said motor, and automatic control means actuated by said shiftable means and connected to said direction determining means for operating said further means in a cyclic sequence to impart to the motor a gradual to-and-fro hunting motion throughout a drive ratio-varying operation, and means for limiting the motor speed to a predetermined low value during such hunting motion.

12. The assembly claimed in claim 11, wherein said speed limiting means comprises switch means responsive to the speed of the motor.

13. In the assembly claimed in claim 11, means operated by said speed limiting means for preventing the shifting of said shiftable means when the motor speed is higher than said predetermined low value.

14. In a power transmission system the combination with an electric motor operable in two directions and connectible to an electric supply for effecting operation of said motor, direction determining means connected to said motor and operable to determine the direction of operation of said motor upon connection of said motor to said supply, and a variable ratio transmission device operatively connected to said motor for transmitting power from said motor and having a given transmission element movable to and from a position of engagement with a second transmission element of said variable ratio device determining a given ratio of transmission, of means connected in circuit with said motor and operable electrically to determine the speed of said motor, control means operatively connected to said electrical speed determining means and operable for effecting operation of said speed determining means to determine a speed of said motor less than its normal operating speed, said control means being operatively connected to said direction determining means for effecting when said motor is operating in a given direction operation of said direction determining means to determine the opposite direction of operation of said motor concomitantly with said operation of said speed determining means to determine said speed less than said normal speed, said control means being operatively connected to said electrical speed determining means for effecting operation of said speed determining means to determine a speed of said motor operating in said opposite direction less than said normal operating speed, and means operatively connecting said control means to said given transmission element for effecting said engagement of said transmission elements concomitantly with change of the speed of the motor in the range between said reduced speeds thereof in said two directions of operation.

15. In a power transmission system the combination with a reversible electric motor connectible to an electric supply for effecting operation of said motor, a reversing switch connected to said motor and to said supply and operable to connect said motor to said supply and to determine forward and reverse directions of rotation of said motor, a variable ratio gear transmission device operatively connected to said motor for transmitting power from said motor, said transmission device having a given gear movable to and from a position of engagement with a second gear of said transmission device determining a given ratio of transmission, and means operatively connected to said given gear and operable to effect movement of said given gear to and from said position of engagement with said second gear, of means connected in circuit with a winding of said motor and operable to two positions electrically to determine respectively the normal operating speed of said motor and a speed less than said normal operating speed, control means operatively connected to said electrical speed determining means and operable for effecting operation of said speed determining means to change the speed of said motor between said normal operating speed and said speed less than said normal operating speed, said control means being operatively connected to said reversing switch for effecting when said motor is rotating in a given direction operation of said reversing switch concomitantly with operation of said speed determining means to determine said speed of said motor less than said normal operating speed for reversing the direction of rotation of said motor and determining the speed of said motor in said opposite direction less than said normal operating speed, and means operatively connecting said control means to said means operable to move said given gear to and from said position of engagement with said second gear for effecting said engagement of said gears concomitantly with said change of speed of said motor between said reduced speed in one direction and said reduced speed in the opposite direction.

16. In a power transmission system the combination as defined in claim 14 which comprises means responsive to the speed of said motor and operatively connected to said control means and to said means electrically determining the speed of said motor for determining in each of said two opposite directions of operation a speed of said motor lower than said speed less than said normal operating speed, said speed responsive means being operatively connected to said direction determining means to effect operation of said direction determining means when said motor is operating in a given direction at said speed lower than said speed less than the normal operating speed to determine the opposite direction of operation of said motor concomitantly with movement of said given transmission element to and from said position of engagement with said second transmission element.

17. In a power transmission system the combination as defined in claim 16 in which said speed responsive means comprises a device operatively connected to said motor for operation of said device to different positions in response to different speeds of said motor, and a switch connected in circuit with said control means and actuated by said device at a predetermined position of said device for operating said switch substantially at said speed less than said normal operating speed of said motor.

18. In a power transmission system the combination with an induction motor having field windings adapted to be connected respectively in star and delta, field control means connected to said field windings and operable to two positions for effecting said connections of said field windings respectively in star and delta, a reversing switch connected to said field control means and to said supply and operable to connect said windings to said supply to determine respectively forward and reverse directions of rotation of said motor for either connection of said field windings, a variable ratio gear transmission device operatively connected to said motor for transmitting power from said motor, said transmission device having a given gear movable to and from a position of engagement with a second gear of said transmission device determining a given ratio of transmission, and means operatively connected to said given gear and operable to effect movement of said given gear to and from said position of engagement with said second gear, of operation control means connected to said field control means and operable to effect operation of said field control means to said two positions to determine respectively said delta connection for normal operating speed and said star connection for a speed less than said normal operating speed, said operation control means being operatively connected to said reversing switch for effecting when said motor is rotating in a given direction operation of said reversing switch to reverse the direction of rotation of said motor concomitantly with operation of said field control means to change said connection of said field windings from said delta connection to said star connection to reduce the speed of said motor to said speed less than said normal operating speed and concomitantly to determine the speed of said motor in said opposite direction at a speed less than said normal operating speed, and means operatively connecting said operation control means to said means operable to effect movement of said given transmission gear to and from said position of engagement with said second transmission gear for effecting said engagement and disengagement of said gears concomitantly with said change of speed of said motor between said reduced speed in one direction and said reduced speed in the opposite direction.

References Cited in the file of this patent

UNITED STATES PATENTS

| | | |
|---|---|---|
| 2,102,655 | Straw | Dec. 21, 1937 |
| 2,647,411 | Filocamo | Aug. 4, 1953 |
| 2,755,679 | Nallinger | July 24, 1956 |

UNITED STATES PATENT OFFICE
CERTIFICATE OF CORRECTION

Patent No. 2,912,875                                                         November 17, 1959

Frederick Charles Gilbert Berthiez

It is hereby certified that error appears in the printed specification of the above numbered patent requiring correction and that the said Letters Patent should read as corrected below.

Column 2, line 23, for "in line" read -- on line --; column 3, line 16, after "winding 56" insert a period; same line strike out "as well as the latch 62 controlled."; column 6, line 73, for "even through" read -- even though --; column 8, line 10, for "K at the time +V" read -- +V at the time k --.

Signed and sealed this 17th day of May 1960.

(SEAL)
Attest:

KARL H. AXLINE                                                    ROBERT C. WATSON
Attesting Officer                                        Commissioner of Patents